United States Patent
Zimmermann

(10) Patent No.: US 7,120,168 B2
(45) Date of Patent: Oct. 10, 2006

(54) SYSTEM AND METHOD FOR EFFECTIVELY PERFORMING AN AUDIO/VIDEO SYNCHRONIZATION PROCEDURE

(75) Inventor: Klaus Zimmermann, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 959 days.

(21) Appl. No.: 09/989,560

(22) Filed: Nov. 20, 2001

(65) Prior Publication Data

US 2003/0095574 A1    May 22, 2003

(51) Int. Cl.
*H04J 3/06* (2006.01)

(52) U.S. Cl. ..................... 370/503; 370/498
(58) Field of Classification Search .......... 370/486, 370/498, 473, 412, 503, 464, 100.1
See application file for complete search history.

(56) References Cited

U.S. PATENT DOCUMENTS

| | | | | |
|---|---|---|---|---|
| 5,668,601 | A * | 9/1997 | Okada et al. | 375/240.25 |
| 5,771,075 | A * | 6/1998 | Rim et al. | 348/512 |
| 5,808,722 | A * | 9/1998 | Suzuki | 352/12 |
| 5,898,695 | A * | 4/1999 | Fujii et al. | 370/464 |
| 6,061,399 | A * | 5/2000 | Lyons et al. | 375/240 |
| 6,064,676 | A * | 5/2000 | Slattery et al. | 370/412 |
| 6,236,432 | B1 * | 5/2001 | Lee | 375/240.26 |
| 6,246,701 | B1 * | 6/2001 | Slattery | 370/503 |
| 6,356,567 | B1 * | 3/2002 | Anderson et al. | 370/516 |
| 6,584,120 | B1 * | 6/2003 | Shiomoto et al. | 370/473 |
| 6,654,421 | B1 * | 11/2003 | Hanamura et al. | 375/240.26 |
| 6,873,629 | B1 * | 3/2005 | Morris | 370/535 |
| 6,931,071 | B1 * | 8/2005 | Haddad et al. | 375/240.28 |

OTHER PUBLICATIONS

"Information Technology"—Generic Coding Of Moving Pictures And Associated Audio: Systems, Recommendation H.222.0, ISO/IEC 13818-1.

* cited by examiner

*Primary Examiner*—Ricky Q. Ngo
*Assistant Examiner*—Andrew C. Lee
(74) *Attorney, Agent, or Firm*—Gregory J. Koerner; Redwood Patent Law

(57) ABSTRACT

A system and method for effectively performing an audio/video synchronization procedure in a receiver device may preferably include a demultiplexer configured to recover elementary bitstreams from a multiplexed bitstream. The demultiplexer may also preferably extract decode timestamps and output timestamps corresponding to the elementary bitstreams. One or more decoders may then decode the elementary bitstreams to produce decoded frames in accordance with the foregoing decode timestamps. One or more output modules may then process the decoded frames to produce processed frames in accordance with the output timestamps. In accordance with the present invention, an output controller may preferably perform an output timing resynchronization procedure following a program change event to align output timings of the processed frames in accordance with new output timestamps from the selected program.

23 Claims, 8 Drawing Sheets

SYSTEM AND METHOD FOR EFFECTIVELY PERFORMING AN AUDIO/VIDEO SYNCHRONIZATION PROCEDURE

BACKGROUND SECTION

1. Field of the Invention

This invention relates generally to techniques for managing electronic information, and relates more particularly to a system and method for effectively performing an audio/video synchronization procedure.

2. Description of the Background Art

Implementing effective methods for managing electronic information is a significant consideration for designers and manufacturers of contemporary electronic devices. However, effectively managing information utilized by electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, processes, and outputs digital image data may benefit from an efficient implementation because of the large amount and complexity of the digital data involved.

Due to growing demands on system resources and substantially increasing data magnitudes, it is apparent that developing new techniques for managing information is a matter of concern for related electronic technologies. Therefore, for all the foregoing reasons, developing effective systems for managing electronic information remains a significant consideration for designers, manufacturers, and users of contemporary electronic devices.

SUMMARY

In accordance with the present invention, a system and method for effectively performing an audio/video synchronization procedure are disclosed. In one embodiment, initially, a system user may preferably instruct a receiver device to select a different program by utilizing any appropriate means. In response, the receiver device may preferably search for the selected program. Then, a demultiplexer from the receiver device may preferably demultiplex the foregoing selected program to produce appropriate elementary streams (for example, a video bitstream and an audio bitstream), and may also preferably extract video decode timestamps, audio decode timestamps, video output timestamps, and audio output timestamps.

Next, an input controller may preferably instruct a video decoder or an audio decoder to generate a decoded frame when a particular respective corresponding decode timestamp equals a receiver system time clock. The receiver device may then write the decoded frame to a corresponding video output buffer or audio output buffer. The foregoing process may then sequentially continue to produce additional decoded frames using techniques similar to those described above.

In accordance with the present invention, an output controller may preferably determine whether output frame timings of a video output module and an audio output module are aligned to the respective current video output timestamps or current audio output timestamps. If the output timings are not aligned, then the output controller may preferably resynchronize the output frame timings to align with the respective current video output timestamps or current audio output timestamps.

The output controller may then preferably instruct the video output module or audio output module to output a current respective decoded frame when a corresponding video output timestamp or audio output timestamp equals the receiver system time clock. The foregoing process may then preferably continue demultiplexing, decoding, and outputting frames of data for utilization by an appropriate data destination, such as a video display device or an audio reproduction system. The present invention thus provides an improved system and method for effectively performing an audio/video synchronization procedure.

DETAILED DESCRIPTION

The present invention relates to an improvement in electronic data synchronization techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing an audio/video synchronization procedure in a receiver device, and may preferably include a demultiplexer configured to recover elementary bitstreams from a received multiplexed bitstream. The demultiplexer may also preferably extract decode timestamps and output timestamps corresponding to the elementary bitstreams. One or more decoders may then decode the elementary bitstreams to produce decoded frames in accordance with the foregoing decode timestamps. One or more output modules may then process the decoded frames to produce processed frames in accordance with the output timestamps. In accordance with the present invention, an output controller may preferably perform an output timing resynchronization procedure following a program change event to align output timings of the processed frames in accordance with new output timestamps from the selected program.

Figure 1:
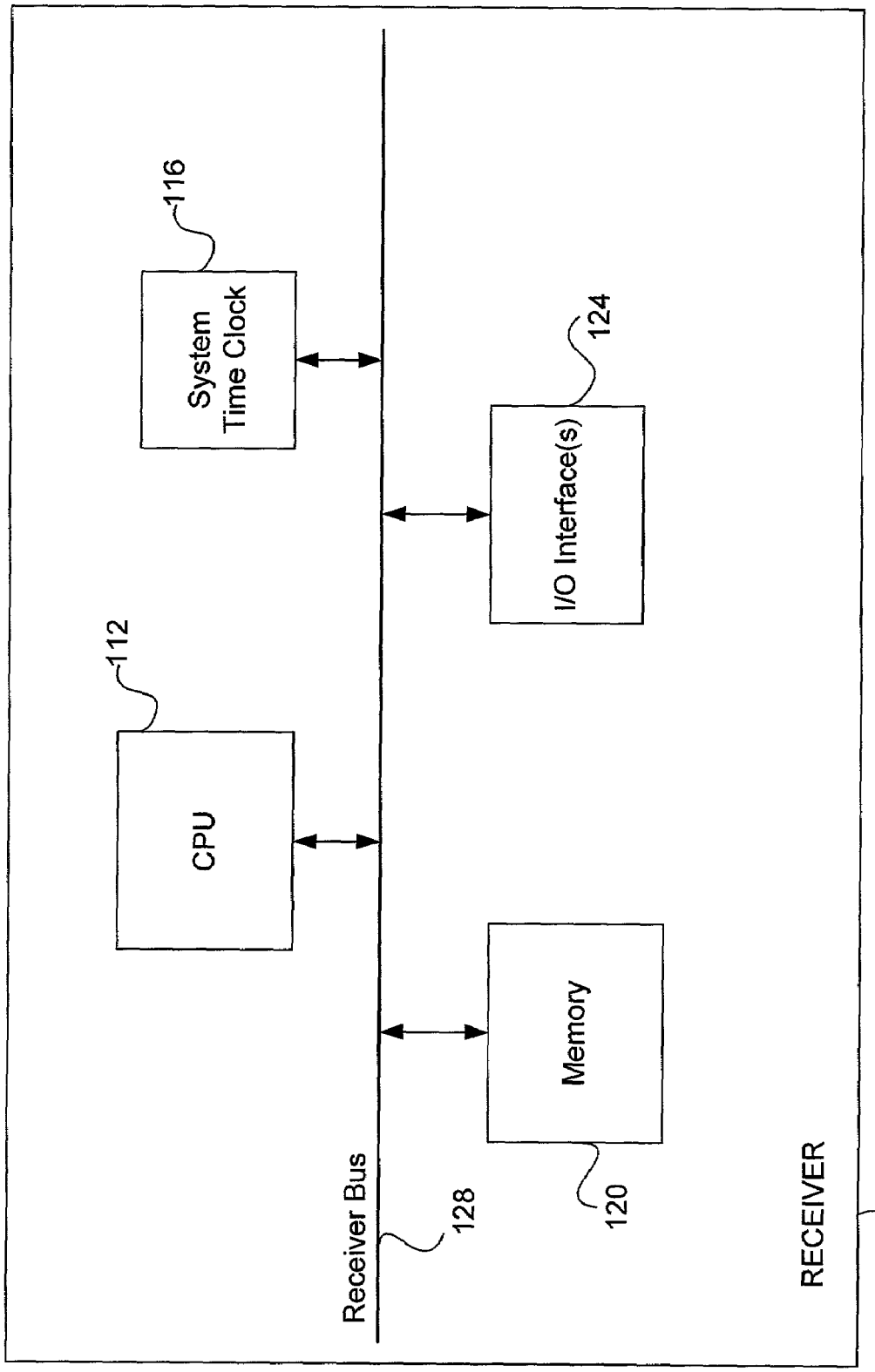
FIG. 1 is a block diagram for one embodiment of a receiver device, in accordance with the present invention.

Referring now to FIG. 1, a block diagram for one embodiment of a receiver device 130 is shown, in accordance with the present invention. In the FIG. 1 embodiment, receiver 130 preferably includes, but is not limited to, a central processing unit (CPU) 112, a system time clock 116, a device memory 120, and one or more input/output interface(s) (I/O interface(s)) 124. Selected ones of the foregoing components of receiver 130 may preferably be coupled to, and communicate through, a receiver bus 128.

In alternate embodiments, receiver 130 may readily be implemented using various components and configurations in addition to, or instead of, those discussed in conjunction with the FIG. 1 embodiment. In addition, receiver 130 may be implemented as part of any desired type of electronic system. For example, in certain embodiments, receiver 130 may be implemented as part of a video display system, a computer device, or an electronic device that supports wireless electronic communications.

In the FIG. 1 embodiment, CPU 112 may be implemented to include any appropriate and compatible microprocessor device that preferably executes software instructions to thereby control and manage the operation of receiver 130. In the FIG. 1 embodiment, system time clock 116 may preferably generate a series of clock pulses that may be utilized for providing timing information for various components of receiver 130. System time clock 116 may be implemented in any appropriate and effective manner.

In the FIG. 1 embodiment, memory 120 may be implemented to include any combination of desired storage devices, including, but not limited to, read-only memory (ROM), random-access memory (RAM), and various types of non-volatile memory, such as floppy disks or hard disks. The contents and functionality of memory 120 are further discussed below in conjunction with FIG. 2. In the FIG. 1 embodiment, I/O interface(s) 124 may preferably include one or more input and/or output interfaces to receive or transmit any required types of information for receiver 130. I/O interface(s) 124 are further discussed below in conjunction with FIG. 3.

Figure 2:
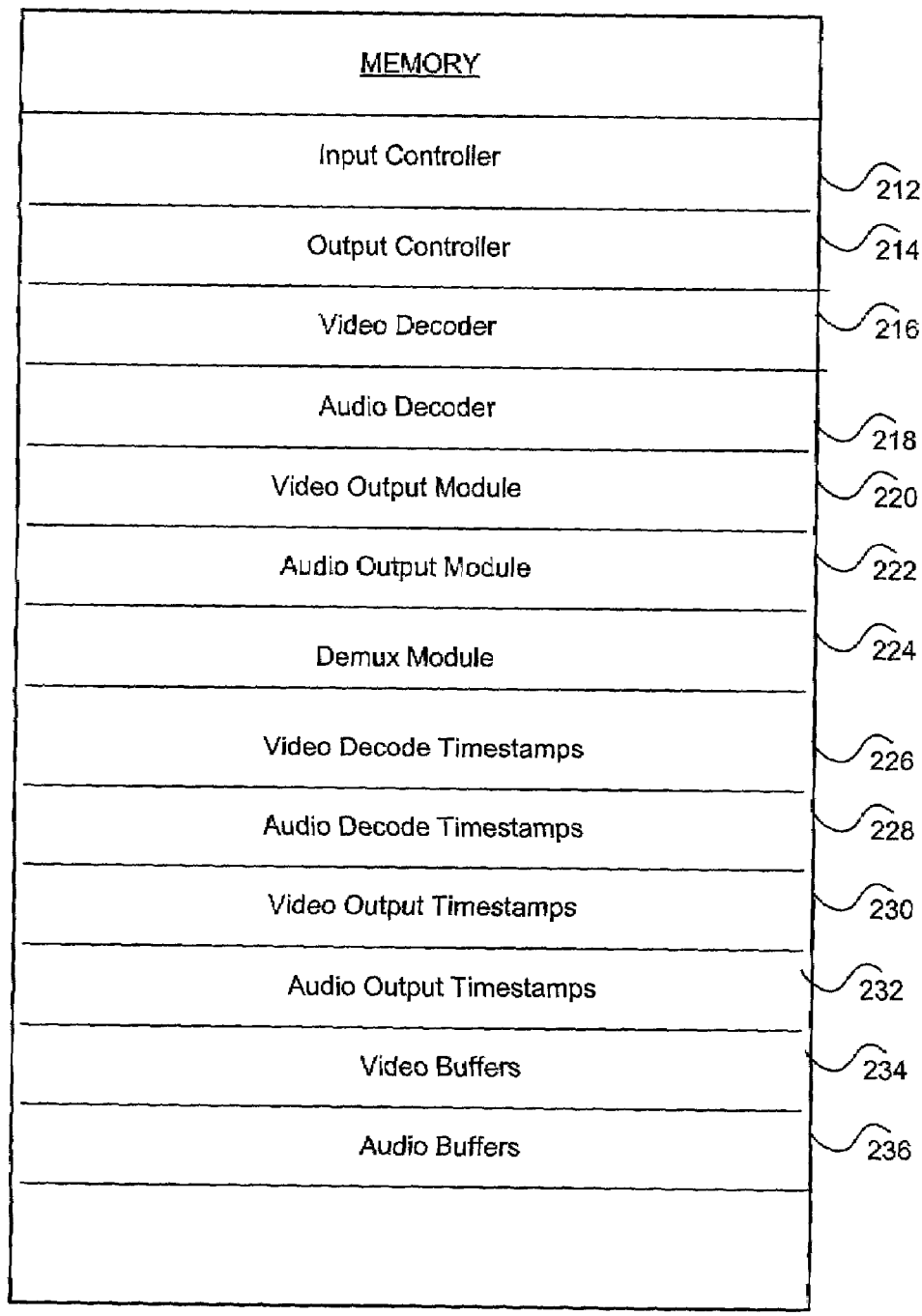
FIG. 2 is a block diagram for one embodiment of the memory of FIG. 1, in accordance with the present invention.

Referring now to FIG. 2, a block diagram for one embodiment of the FIG. 1 memory 120 is shown, in accordance with the present invention. In the FIG. 2 embodiment, memory 120 preferably includes, but is not limited to, an input controller 212, an output controller 214, a video decoder 216, an audio decoder 218, a video output module 220, an audio output module 222, a demultiplexer (demux) module 224, video decode timestamps 226, audio decode timestamps 228, video output timestamps 230, audio output timestamps 232, video buffers 234, and audio buffers 236.

In alternate embodiments, memory 120 may readily include various other components in addition to, or instead of, those components discussed in conjunction with the FIG. 2 embodiment. The functionality and utilization of the foregoing components of memory 120 are further discussed below in conjunction with FIGS. 3 through 8.

Figure 3:
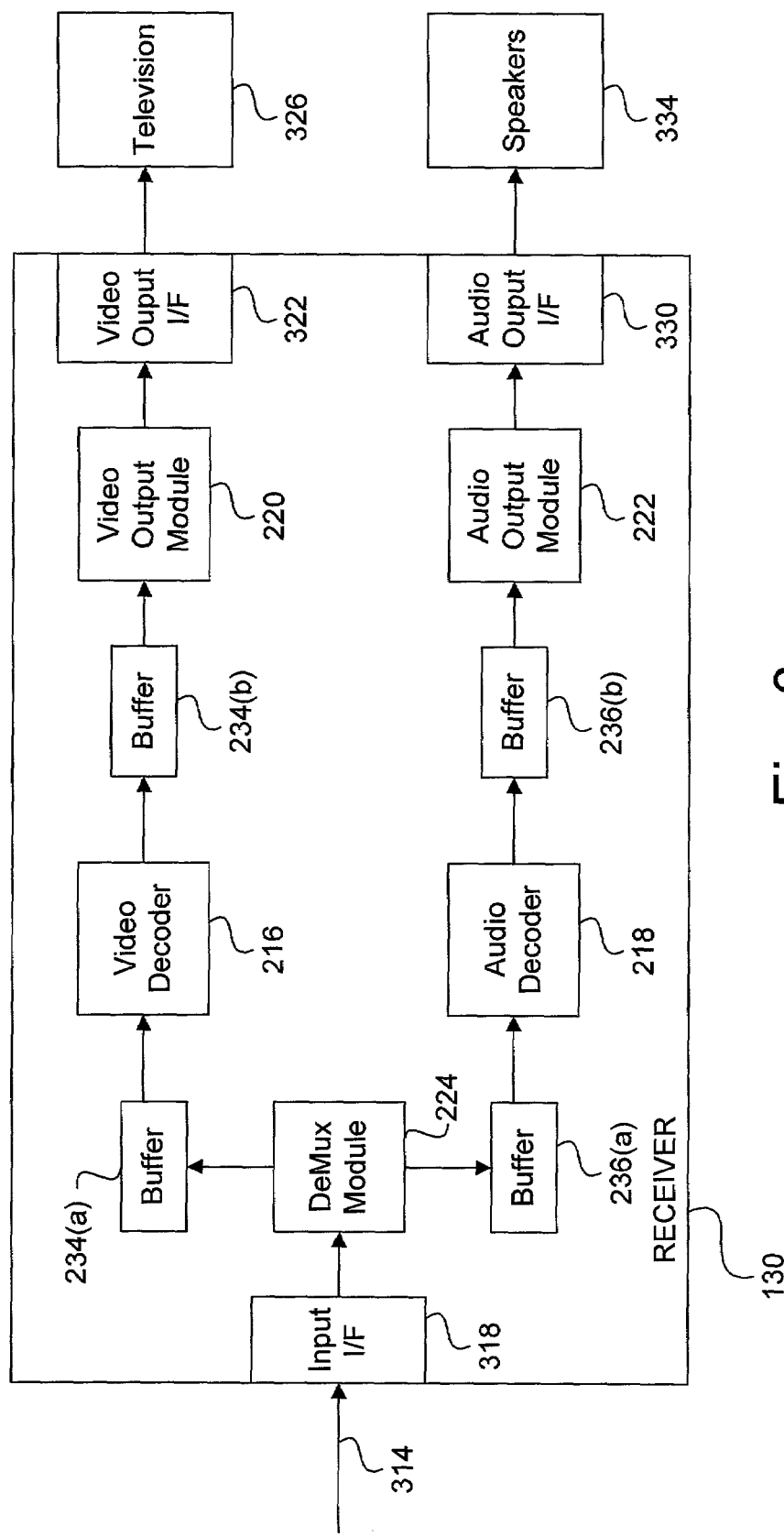
FIG. 3 is a block diagram illustrating an audio/video synchronization procedure for the receiver of FIG. 1, in accordance with one embodiment of the present invention.

Referring now to FIG. 3, a block diagram illustrating an audio/video synchronization procedure for the FIG. 1 receiver 130 is shown, in accordance with one embodiment of the present invention. In alternate embodiments, the present invention may readily perform audio/video synchronization procedures by utilizing various components, configurations, and techniques in addition to, or instead of, those discussed in conjunction with the FIG. 3 embodiment.

In the FIG. 3 embodiment, an input interface (I/F) 318 may preferably receive a multiplexed bitstream via path 314. The multiplexed bitstream may be formatted in any appropriate manner. For example, in certain embodiments, the multiplexed bitstream may comply with a Motion Picture Experts Group (MPEG) standard. A demultiplexer (demux) module 224 may then access the multiplexed bitstream and responsively demultiplex the multiplexed bitstream into one or more elementary streams. For example, in the FIG. 3 embodiment, demux module 224 may preferably provide a video bitstream to buffer 234(a) and may similarly provide an audio bitstream to buffer 236(a).

In addition, demux module 224 may preferably extract various timestamps from the multiplexed bitstream and store the extracted timestamps into memory 120 (FIG. 2). In the FIG. 3 embodiment, demux module 224 may preferably extract video decode timestamps 226, audio decode timestamps 228, video output timestamps 230, and audio output timestamps 232. The foregoing timestamps may exist in any appropriate format. For example, in an embodiment in which the multiplexed bitstream is provided according to an MPEG standard, the video decode timestamps 226 and the audio decode timestamps 228 may be embodied as decode timestamps (DTS). Similarly, the video output timestamps 230 and the audio output timestamps 232 may be embodied as presentation timestamps (PTS).

In the FIG. 3 embodiment, an input controller 212 (FIG. 2) may preferably activate video decoder 216 to access the foregoing video bitstream from buffer 234(a). Video decoder 216 may then responsively decode the video bitstream to thereby provide a series of decoded video frames to buffer 234(b). In the FIG. 3 embodiment, input controller 212 may preferably access and compare the extracted video decode timestamps 226 to a current time value of system time clock 116 (FIG. 1), and may preferably activate video decoder 216 when the video decode timestamps 226 are equal to the current time value of the system time clock 116.

Similarly, in the FIG. 3 embodiment, an output controller 214 (FIG. 2) may preferably activate video output module 220 to access the foregoing decoded video frames from buffer 234(b). Video output module 220 may then responsively perform various types of processing upon the decoded video frames to thereby provide a series of processed video frames to video output interface (I/F) 322. In the FIG. 3 embodiment, video output module 220 may perform any desired type of processing upon the decoded video frames.

In the FIG. 3 embodiment, video output I/F 322 may then provide the processed video frames to a television 326 (or other appropriate output device) in accordance with a controllable output frame timing sequence. In the FIG. 3 embodiment, output controller 214 may preferably access and compare the extracted video output timestamps 230 to a current time value of system time clock 116 (FIG. 1), and may preferably output the processed video frames when the video output timestamps 230 are equal to the current time value of the system time clock 116. Since input controller 212 and output controller 214 operate independently, the operation of video decoder 216 and video output module 220 are advantageously decoupled to permit more flexible synchronization and operation of receiver 130.

In the FIG. 3 embodiment, input controller 212 may also preferably activate audio decoder 218 to access the foregoing audio bitstream from buffer 236(a). Audio decoder 218 may then responsively decode the audio bitstream to thereby provide a series of decoded audio frames to buffer 236(b). In the FIG. 3 embodiment, input controller 212 may preferably access and compare the extracted audio decode timestamps 228 to a current time value of system time clock 116, and may preferably activate audio decoder 218 when the audio decode timestamps 228 are equal to the current time value of the system time clock 116.

Similarly, in the FIG. 3 embodiment, output controller 214 may also preferably activate audio output module 222 to access the foregoing decoded audio frames from buffer 236(b). Audio output module 222 may then responsively perform various types of processing upon the decoded audio frames to thereby provide a series of processed audio frames to audio output interface (I/F) 330. In the FIG. 3 embodiment, audio output module 222 may perform any desired type of processing upon the decoded audio frames.

In the FIG. 3 embodiment, audio output I/F 330 may then provide the processed audio frames to speakers 334 (or other appropriate output device) in accordance with a controllable output frame timing sequence. In the FIG. 3 embodiment, output controller 214 may preferably access and compare the extracted audio output timestamps 232 to a current time value of system time clock 116, and may preferably output the processed audio frames when the audio output timestamps 232 are equal to the current time value of the system time clock 116. Since input controller 212 and output controller 214 operate independently, the operation of audio decoder 216 and audio output module 220 are advantageously decoupled to permit more flexible synchronization and operation of receiver 130.

In addition, since video timestamps 226 and 230 are used to control the video signal path, and since audio timestamps 228 and 232 are used to control the audio signal path, receiver 130 may therefore advantageously utilize different timebases for decoding and outputting the respective video frames and audio frames.

Figure 4:
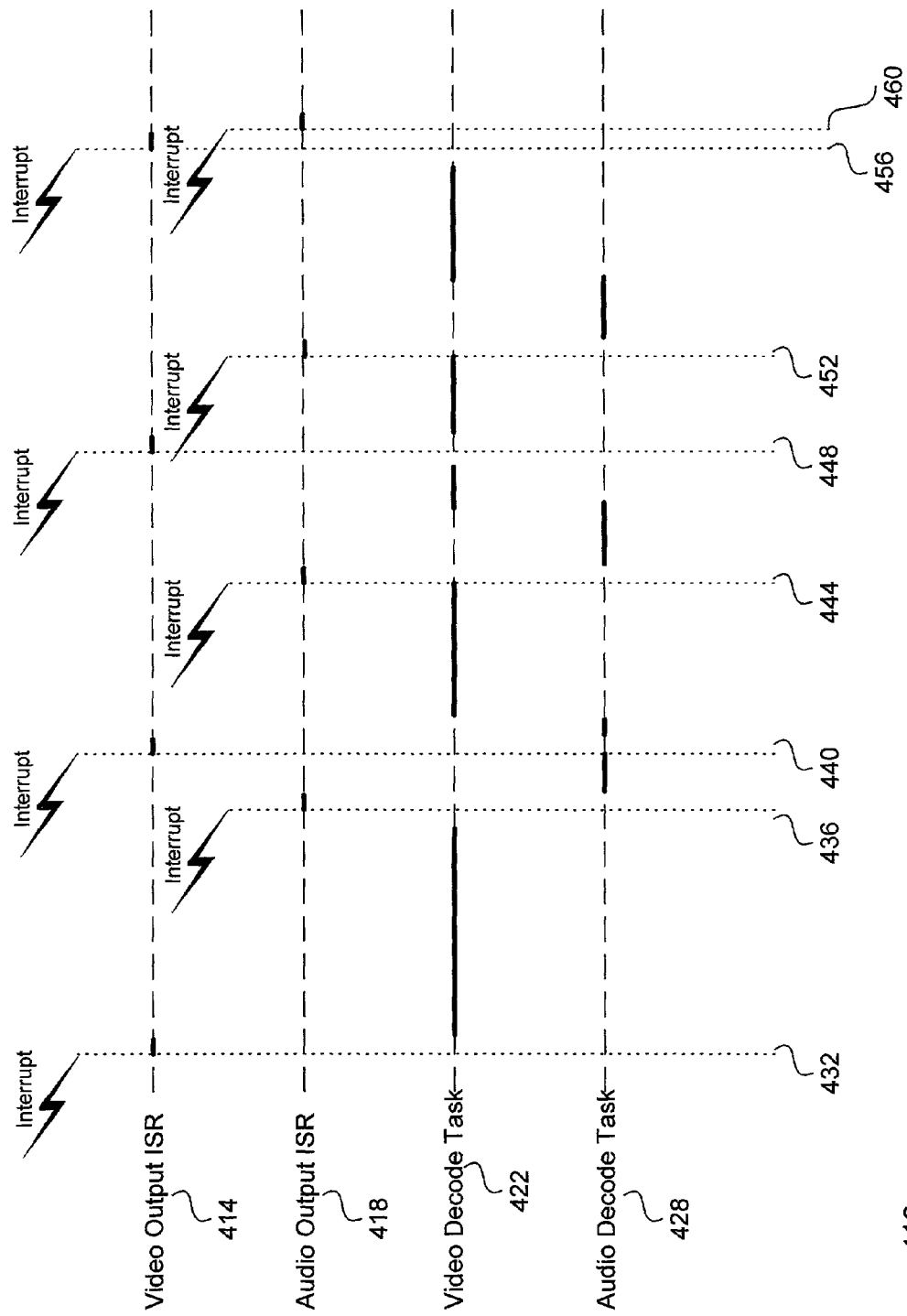
FIG. 4 is an exemplary timing diagram for an equilibrium state in the receiver of FIG. 1, in accordance with one embodiment of the present invention.

Referring now to FIG. 4, an exemplary timing diagram 410 for an equilibrium state in the FIG. 1 receiver 130 is shown, in accordance with one embodiment of the present invention. FIG. 4 is presented for purposes of illustration, and in alternate embodiments, receiver 130 may operate in an equilibrium state by utilizing various timing relationships in addition to, or instead of, those discussed in conjunction with the FIG. 4 embodiment.

In the FIG. 4 embodiment, timing diagram 410 preferably includes a video output interrupt service routine (ISR) 414, an audio output interrupt service routine (ISR) 418, a video decode task 422, and an audio decode task 428. In the FIG. 4 embodiment, a series of video interrupts may preferably be generated whenever receiver 130 outputs a processed video frame. In addition, in the FIG. 4 embodiment, a series of audio interrupts may preferably be generated when receiver 130 outputs a processed audio frame. By utilizing the foregoing interrupt mechanisms, a video output process or an audio output process may thus have priority over contemporaneous decoding processes.

In the FIG. 4 example, in response to a video interrupt at time 432, a video output ISR 414 is preferably executed by receiver 130. In timing diagram 410, the foregoing video output ISR is represented by a solid horizontal black line. Next, a video decode task 422 is preferably executed by receiver 130 to produce the next decoded video frame. In timing diagram 410, the foregoing video decode task is represented by another solid horizontal black line.

Similarly, in response to an audio interrupt at time 436, an audio output ISR 418 is preferably executed by receiver 130. Next, a portion of an audio decode task 428 may preferably be executed by receiver 130. Then, at time 440 in response to another video interrupt, a portion of another video output ISR 414 may preferably be executed by receiver 130. Next, remaining portions of the foregoing audio decode task 428 and the foregoing video decode task 422 may preferably be sequentially executed. Then, in response to another audio interrupt at time 444, another audio output ISR 418 is preferably executed by receiver 130. Continuing in this manner, as illustrated by timing diagram 410, receiver 130 may continue to effectively service video interrupts and audio interrupts.

In accordance with the present invention, as illustrated in timing diagram 410, receiver 130 may thus advantageously utilize different timebases for decoding and outputting video frames and audio frames. For example, in timing diagram 410, receiver 130 utilizes a video timebase that may be illustrated as being equal to the period between time 432 and time 440. In addition, in timing diagram 410, receiver 130 utilizes an audio timebase that may be illustrated as being equal to the period between time 436 and time 444.

Figure 5:
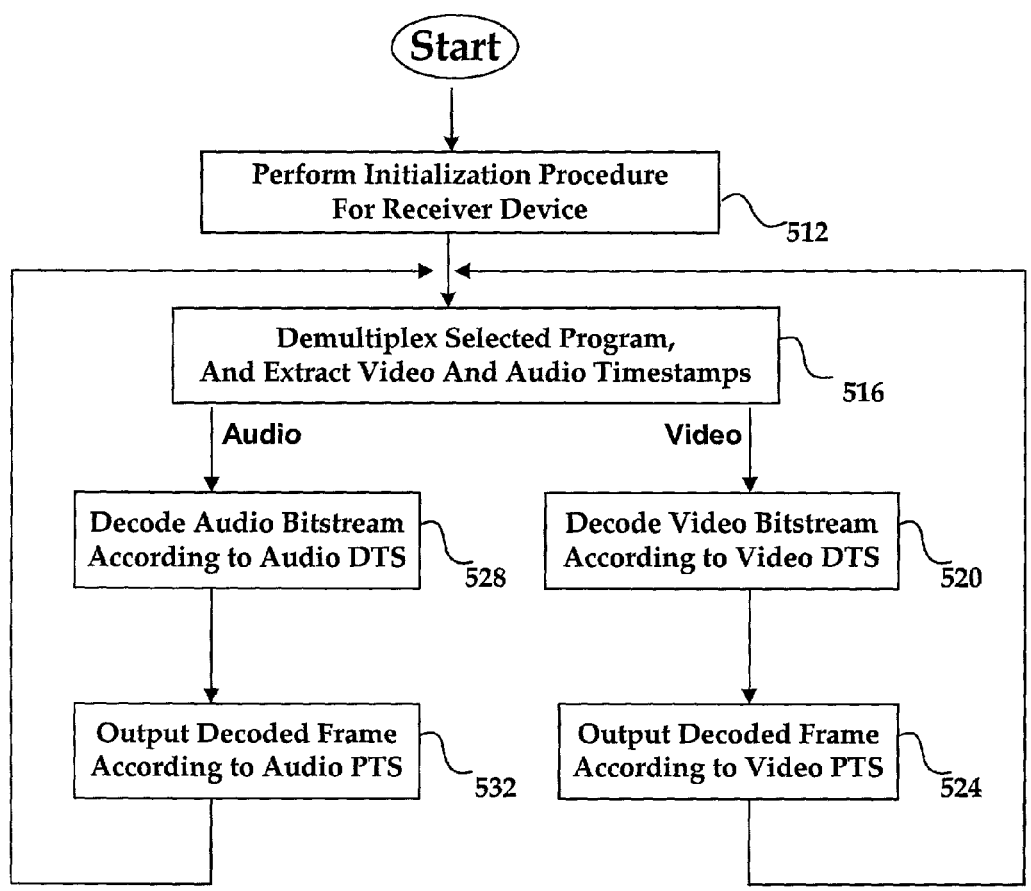
FIG. 5 is a flowchart of method steps for performing an audio/video synchronization procedure, in accordance with one embodiment of the present invention.

Referring now to FIG. 5, a flowchart of method steps for performing an audio/video synchronization procedure is shown, in accordance with one embodiment of the present invention. The FIG. 5 example is presented for purposes of illustration, and in alternate embodiments, the present invention may readily utilize various other steps and sequences than those discussed in conjunction with the FIG. 5 embodiment.

In the FIG. 5 embodiment, in step 512, receiver device 130 may preferably perform an initialization procedure to setup the operation of various receiver functions and processes. Then, in step 516, a demux module 224 of receiver 130 may preferably demultiplex a selected program to produce appropriate elementary streams (for example, a video bitstream and an audio bitstream), and may also preferably extract video timestamps (video decode timestamps 226 and video output timestamps 230) and audio timestamps (audio decode timestamps 228 and audio output timestamps 232).

Receiver 130 may then concurrently or sequentially perform various appropriate decoding processes and output processes. In the FIG. 5 embodiment, in step 520, input controller 212 may preferably instruct video decoder 216 to decode the foregoing video bitstream in accordance with a corresponding video decode timestamp 226 (such as the DTS discussed above in conjunction with FIG. 3) to produce a decoded video frame. In step 524 of the FIG. 5 embodiment, output controller 214 may preferably instruct video output module 220 to process the foregoing decoded video frame to produce a processed video frame, and to output the processed video frame in accordance with a corresponding video output timestamp 230 (such as the PTS discussed above in conjunction with FIG. 3). The FIG. 5 process may then return to step 516 to continue demultiplexing, decoding, and outputting the video bitstream.

Similarly, in the FIG. 5 embodiment, in step 528, input controller 212 may preferably instruct audio decoder 218 to decode the foregoing audio bitstream in accordance with a corresponding audio decode timestamp 228 (such as the DTS discussed above in conjunction with FIG. 3) to produce a decoded audio frame. In step 532 of the FIG. 5 embodiment, output controller 214 may preferably instruct audio output module 222 to process the foregoing decoded audio frame to produce a processed audio frame, and to output the processed audio frame in accordance with a corresponding audio output timestamp 232 (such as the PTS discussed above in conjunction with FIG. 3). The FIG. 5 process may then return to step 516 to continue demultiplexing, decoding, and outputting the audio bitstream.

Figure 6:
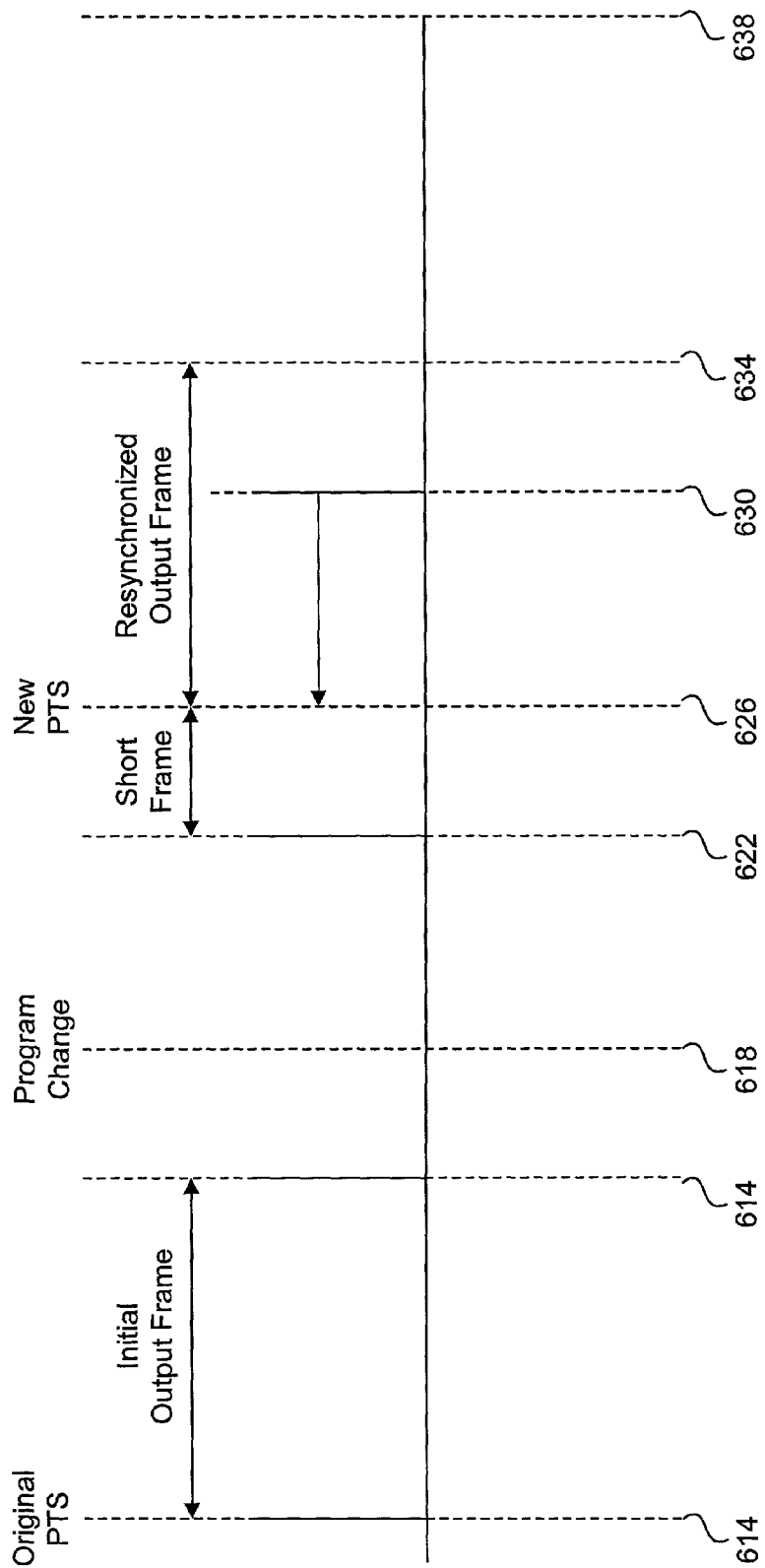
FIG. 6 is an exemplary timing diagram for performing an output timing resynchronization procedure, in accordance with one embodiment of the present invention.

Referring now to FIG. 6, an exemplary timing diagram 610 for performing an output timing resynchronization procedure is shown, in accordance with the present invention. In the FIG. 6 embodiment, the output timing resynchronization procedure may preferably occur as a result of any appropriate event. For example, an output timing resynchronization procedure may be necessitated by a system user selecting a different program (with different timestamps) for processing by receiver 130. Alternately, an output timing resynchronization procedure may be required following a system powerup of receiver 130, or may become necessary following a discontinuity in the incoming multiplexed bitstream introduced by the particular broadcaster/encoder.

Timing diagram 610 is presented to illustrate certain principles of the present invention, and in alternate embodiments, receiver 130 may perform output timing resynchronization procedures using various timing relationships in addition to, or instead of, those discussed in conjunction with the FIG. 6 embodiment. In addition, the principles discussed in conjunction with the FIG. 6 embodiment may be utilized to resynchronize any type of output frames, including video output frames and audio output frames.

In the FIG. 6 embodiment, a given output frame for outputting data from receiver 130 may preferably begin at time 614, as specified by an original PTS (such as video output timestamp 230 or audio output timestamp 232). In the FIG. 6 embodiment, the following output frame may similarly begin at time 614, and another output frame may begin at time 622.

In the FIG. 6 embodiment, at time 618, a system user may preferably request a program change from receiver 130 by utilizing any appropriate technique. In response, output controller 214 may preferably begin a resynchronized output frame at time 626 in accordance with a new PTS extracted from the newly-selected program. Similarly, a second resynchronized output frame may begin at time 634, and a third resynchronized output frame may begin at time 638. Receiver 130 may then continue generating output frames in a similar manner. As a result of the foregoing output timing resynchronization procedure, a short initial frame of the original output data may preferably occur between time 622 and time 626. The present invention may thus resynchronize the output frame timing to align with new output timestamps extracted from the newly-selected program.

Figure 7:
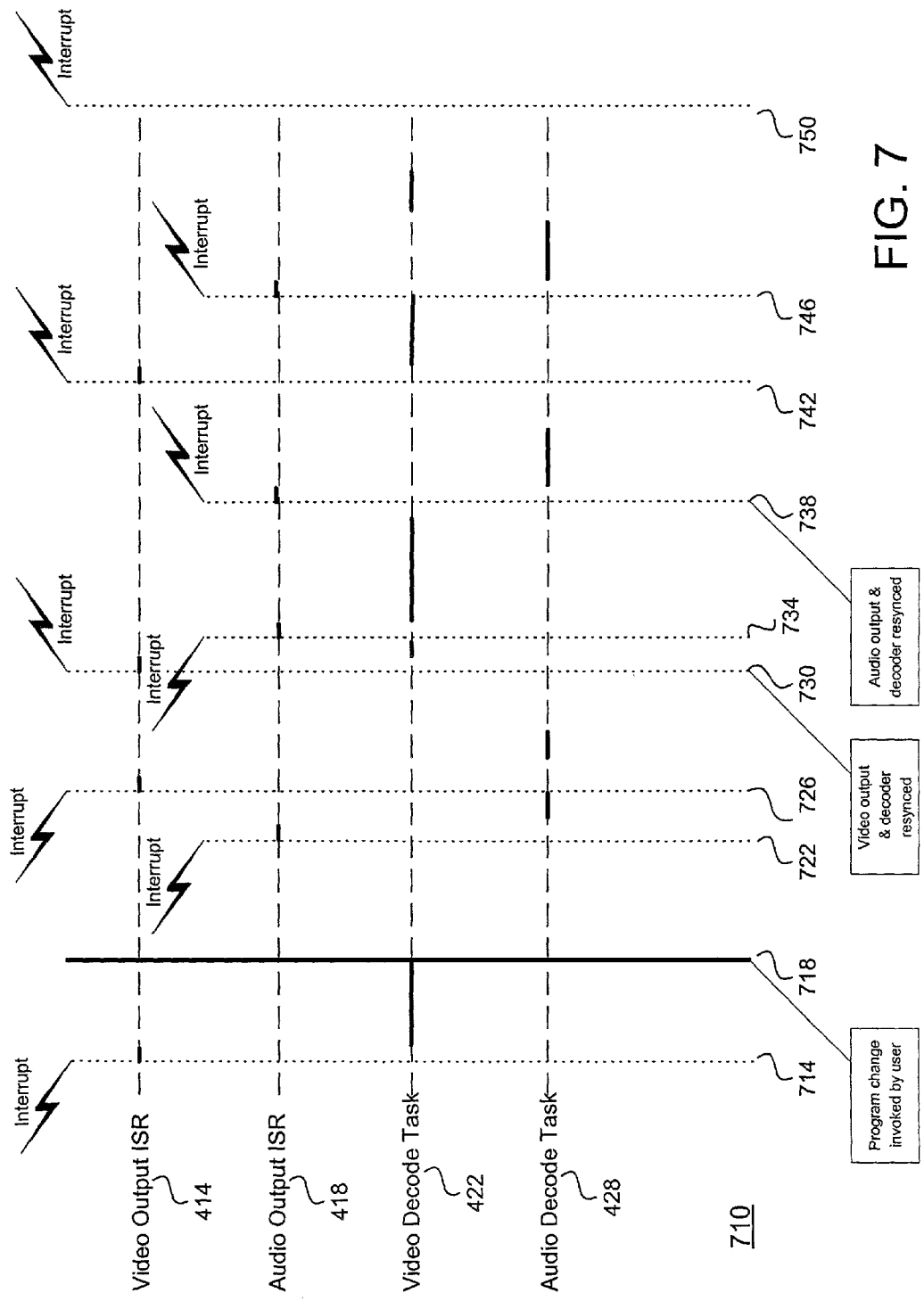
FIG. 7 is an exemplary timing diagram for a program change procedure in the receiver of FIG. 1, in accordance with one embodiment of the present invention.

Referring now to FIG. 7, an exemplary timing diagram for a program change procedure is shown, in accordance with the present invention. In alternate embodiments, receiver 130 may perform program change procedures using various timing relationships in addition to, or instead of, those discussed in conjunction with the FIG. 7 embodiment.

In the FIG. 7 embodiment, timing diagram 710 preferably includes a video output interrupt service routine (ISR) 414, an audio output interrupt service routine (ISR) 418, a video decode task 422, and an audio decode task 428. In the FIG. 7 embodiment, a series of video interrupts may preferably be generated whenever receiver 130 outputs a processed video frame. In addition, in the FIG. 7 embodiment, a series of audio interrupts may preferably be generated when receiver 130 outputs a processed audio frame. By utilizing the foregoing interrupt mechanisms, a video output process or an audio output process may thus have priority over contemporaneous decoding processes, and establish a timebase for audio output and video output, respectively.

In the FIG. 7 example, in response to a video interrupt at time 714, a video output ISR 414 is preferably executed by receiver 130. In timing diagram 710, the foregoing video output ISR is represented by a solid horizontal black line. Next, a video decode task 422 is preferably executed by receiver 130 to produce the next decoded video frame. In timing diagram 710, the foregoing video decode task is represented by another solid horizontal black line.

At time 718, a system user preferably invokes a program change for receiver 130, and receiver 130 begins to look for new output timestamps from the newly-selected program. Meanwhile, in response to an audio interrupt at time 722, an audio output ISR 418 is preferably executed by receiver 130. Next, an initial portion of an audio decode task 428 may preferably be executed by receiver 130. Then, at time 726 in response to another video interrupt, another video output ISR 414 may preferably be executed by receiver 130. Next, receiver 130 may preferably execute a remaining portion of the foregoing audio decode task 428.

In the FIG. 7 embodiment, at time 730, receiver 130 may preferably resynchronize the output frame timing of video output module 220, and receiver 130 may simultaneously execute a video output ISR 414 in response to a resynchronized video interrupt. Next, receiver 130 may preferable execute a portion of a video decode task 422. Then, at time 734, receiver 130 may preferably execute an audio output ISR 418 in response to an audio interrupt, and may next execute the remaining portion of the foregoing video decode task 422.

In the FIG. 7 embodiment, at time 738, receiver 139 may preferably resynchronize the output frame timing of audio output module 222, and receiver 130 may simultaneously execute an audio output ISR 418 in response to a resynchronized audio interrupt. Next, receiver 130 may preferably execute an audio decode task 428.

Continuing in this manner, as further illustrated by timing diagram 710, receiver 130 may continue to effectively service resynchronized video interrupts and audio interrupts. In accordance with the present invention and as illustrated in timing diagram 710, receiver 130 may thus advantageously perform an output timing resynchronization procedure for effectively outputting video frames and audio frames.

Figure 8:
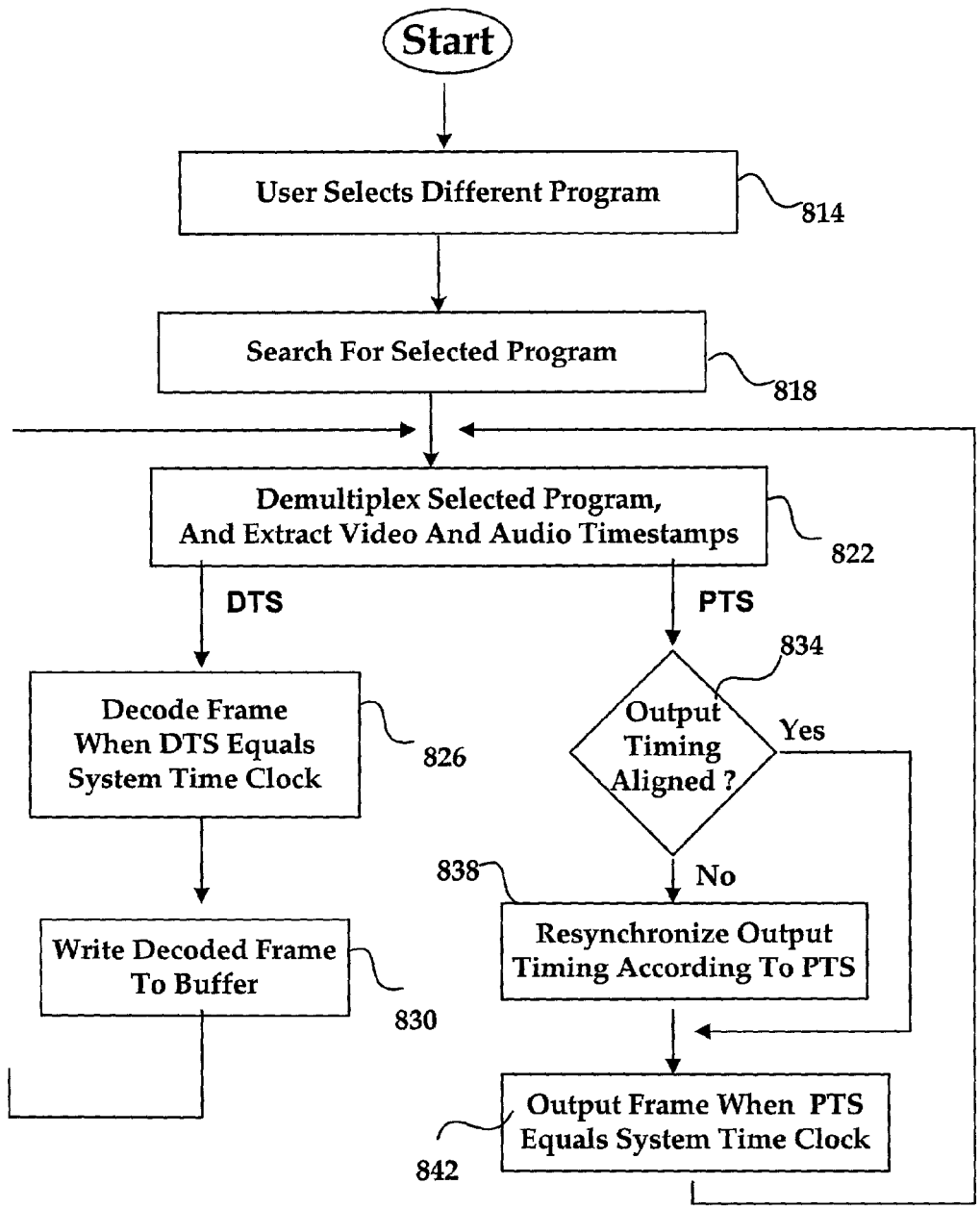
FIG. 8 is a flowchart of method steps for performing a program change procedure in the receiver of FIG. 1, in accordance with one embodiment of the present invention.

Referring now to FIG. 8, a flowchart of method steps for performing a program change procedure is shown, in accordance with one embodiment of the present invention. The FIG. 8 example is presented for purposes of illustration, and in alternate embodiments, the present invention may readily utilize various steps and sequences other than those discussed in conjunction with the FIG. 8 embodiment.

In the FIG. 8 embodiment, in step 814, a system user may preferably select a different program for receiver 130 by utilizing any appropriate means. Then, in step 818, receiver 130 may preferably search for the selected program. In step 822, a demux module 224 of receiver 130 may preferably demultiplex the foregoing selected program to produce appropriate elementary streams (for example, a video bitstream and an audio bitstream), and may also preferably extract video decode timestamps 226 and audio decode timestamps 228 (for example, the DTS discussed above in conjunction with FIG. 3) and video output timestamps 230 and audio output timestamps 232 (for example, the PTS discussed above in conjunction with FIG. 3).

In step 826, input controller 212 may preferably instruct video decoder 216 or audio decoder 218 to generate a decoded frame when a particular respective corresponding DTS equals the system time clock 116. In step 830, receiver 130 may then write the decoded frame to a corresponding buffer 234(b) or 236(b) (FIG. 3). The FIG. 8 process may then return to step 822 and continue to produce additional decoded frames.

In step 834, output controller 214 may determine whether the output frame timings of video output module 220 and audio output module 222 are aligned to the current video output timestamps 230 and current audio output timestamps 232. If the output frame timings are aligned in foregoing step 838, then the FIG. 8 process may preferably advance to step 842. However, if the output frame timings are not aligned, then, as discussed above in conjunction with FIG. 6, output controller 214 may preferably resynchronize the output frame timings in accordance with the current video output timestamps 230 and current audio output timestamps 232 (for example the PTS discussed above).

In step 842, output controller 214 may then preferably instruct video output module or audio output module 222 to output a current respective decoded frame when a corresponding video output timestamp 230 or corresponding audio output timestamp 232 (e.g., the foregoing PTS) equals the system time clock 116. The FIG. 8 process may then preferably return to step 822 to continue demultiplexing, decoding, and outputting frames of data for utilization by an appropriate data destination.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a data synchronization procedure, comprising:
    a demultiplexer configured to recover elementary bitstreams, and to extract decode timestamps and output timestamps corresponding to said elementary bitstreams;
    one or more decoders configured to .decode said elementary bitstreams to produce decoded frames;
    an input controller configured to control said one or more decoders according to said decode timestamps;
    one or more output modules configured to process said decoded frames to produce processed frames; and
    an output controller configured to control said one or more output modules according to said output timestamps, said output controller performing an output timing resynchronization procedure to align output frame timings of said processed frames according to said output timestamps, said data synchronization procedure being performed by a receiver device that receives a multiplexed bitstream from a data source and responsively generates said processed frames to one or more destination devices, said one or more elementary bitstreams including a video bitstream and an audio bitstream, said one or more decoders including a video decoder and an audio decoder, said one or more output modules including a video output module and an audio output module, said output timing resynchronization procedure being performed after receiving new output timestamps as a result of a program change event.

2. A system for performing a data synchronization procedure, comprising:
    a demultiplexer configured to recover elementary bitstreams, and to extract decode timestamps and output timestamps corresponding to said elementary bitstreams;
    one or more decoders configured to decode said elementary bitstreams to produce decoded frames;
    an input controller configured to control said one or more decoders according to said decode timestamps;
    one or more output modules configured to process said decoded frames to produce processed frames; and
    an output controller configured to control said one or more output modules according to said output timestamps, said output controller performing an output timing resynchronization procedure to align output frame timings of said processed frames according to said output timestamps, said data synchronization procedure being performed by a receiver device that receives a multiplexed bitstream from a data source and responsively generates said processed frames to one or more destination devices, said one or more elementary bitstreams including a video bitstream and an audio bitstream, said one or more decoders including a video decoder and an audio decoder, said one or more output modules including a video output module and an audio output module, a system user instructing said receiver device to select a new program, said receiver device responsively performing a program search procedure to locate said new program.

3. The system of claim 2 wherein said demultiplexer separates a composite bitstream into said elementary bitstreams, said decode timestamps including new decode timestamps, said output timestamps including new output timestamps.

4. The system of claim 3 wherein said input controller instructs said one or more decoders to generate one of said decoded frames when a corresponding one of said new decode timestamps equals a receiver system time clock.

5. The system of claim 4 wherein said one or more decoders store said one of said decoded frames into a buffer memory for said one or more output modules to access.

6. The system of claim 5 wherein said receiver device generates a series of decoded frames, said receiver device subsequently outputting a series of processed frames corresponding to said decoded frames.

7. The system of claim 5 wherein said output controller determines whether said output frame timings of said processed frames are aligned with said new output timestamps.

8. The system of claim 7 wherein said output controller performs said output timing resynchronization procedure to align said output frame timings of said processed frames with said new output timestamps.

9. The system of claim 8 wherein said output controller instructs said one or more output modules to sequentially output one of said processed frames when a corresponding one of said new output timestamps equals a receiver system time clock.

10. The system of claim 9 wherein said receiver device outputs a series of processed frames corresponding to said decoded frames.

11. A method for performing a data synchronization procedure, comprising the steps of:
    recovering elementary bitstreams with a demultiplexer that also extracts decode timestamps and output timestamps corresponding to said elementary bitstreams;
    decoding said elementary bitstreams with one or more decoders to produce decoded frames;

controlling said one or more decoders according to said decode timestamps by utilizing an input controller;

processing said decoded frames with one or more output modules to produce processed frames; and controlling said one or more output modules according to said output timestamps by utilizing an output controller that performs an output timing resynchronization procedure to align output frame timings of said processed frames according to said output timestamps, said data synchronization procedure being Performed by a receiver device that receives a multiplexed bitstream from a data source and responsively generates said processed frames to one or more destination devices, said one or more elementary bitstreams including a video bitstream and an audio bitstream, said one or more decoders including a video decoder and an audio decoder, said one or more output modules including a video output module and an audio output module, said output timing resynchronization procedure being performed after receiving new output timestamps as a result of a program change event.

12. A method for performing a data synchronization procedure, comprising the steps of:

recovering elementary bitstreams with a demultiplexer that also extracts decode timestamps and output timestamps corresponding to said elementary bitstreams;

decoding said elementary bitstreams with one or more decoders to produce decoded frames;

controlling said one or more decoders according to said decode timestamps by utilizing an input controller;

processing said decoded frames with one or more output modules to produce processed frames; and controlling said one or more output modules according to said output timestamps by utilizing an output controller that performs an output timing resynchronization procedure to align output frame timings of said processed frames according to said output timestamps, said data synchronization procedure being performed by a receiver device that receives a multiplexed bitstream from a data source and responsively generates said processed frames to one or more destination devices, said one or more elementary bitstreams including a video bitstream and an audio bitstream, said one or more decoders including a video decoder and an audio decoder, said one or more output modules including a video output module and an audio output module, a system user instructing said receiver device to select a new program, said receiver device responsively performing a program search procedure to locate said new program.

13. The method of claim 12 wherein said demultiplexer separates a composite bitstream into said elementary bitstreams, said decode timestamps including new decode timestamps, said output timestamps including new output time stamps.

14. The method of claim 13 wherein said input controller instructs said one or more decoders to generate one of said decoded frames when a corresponding one of said new decode timestamps equals a receiver system time clock.

15. The method of claim 14 wherein said one or more decoders store said one of said decoded frames into a buffer memory for said one or more output modules to access.

16. The method of claim 15 wherein said receiver device generates a series of decoded frames, said receiver device subsequently outputting a series of processed frames corresponding to said decoded frames.

17. The method of claim 15 wherein said output controller determines whether said output frame timings of said processed frames are aligned with said new output timestamps.

18. The method of claim 17 wherein said output controller performs said output timing resynchronization procedure to align said output frame timings of said processed frames with said new output timestamps.

19. The method of claim 18 wherein said output controller instructs said one or more output modules to sequentially output one of said processed frames when a corresponding one of said new output timestamps equals a receiver system time clock.

20. The method of claim 19 wherein said receiver device outputs a series of processed frames corresponding to said decoded frames.

21. A system for performing a data synchronization procedure, comprising:

means for recovering elementary bitstreams, and extracting decode timestamps and output timestamps corresponding to said elementary bitstreams;

means for decoding said elementary bitstreams to produce decoded frames;

means for controlling said means for decoding according to said decode timestamps;

means for processing said decoded frames to produce processed frames;

means for controlling said means for processing according to said output timestamps; and means for performing an output timing resynchronization procedure to align output frame timings of said processed frames according to said output timestamps.

22. A method for performing a data synchronization procedure, comprising the steps of:

recovering elementary bitstreams with a demultiplexer that also extracts decode timestamps and output timestamps corresponding to said elementary bitstreams;

decoding said elementary bitstreams with one or more decoders to produce decoded frames;

controlling said one or more decoders according to said decode timestamps by utilizing an input controller;

processing said decoded frames with one or more output modules to produce processed frames; and controlling said one or more output modules according to said output timestamps by utilizing an output controller that performs an output timing resynchronization procedure to align output frame timings of said processed frames according to said output timestamps, said output timing resynchronization procedure being performed after receiving new output timestamps as a result of a bitstream discontinuity.

23. A method for performing a data synchronization procedure, comprising the steps of:

recovering elementary bitstreams with a demultiplexer that also extracts decode timestamps and output timestamps corresponding to said elementary bitstreams;

decoding said elementary bitstreams with one or more decoders to produce decoded frames;

controlling said one or more decoders according to said decode timestamps by utilizing an input controller;

processing said decoded frames with one or more output modules to produce processed frames; and controlling said one or more output modules according to said output timestamps by utilizing an output controller that performs an output timing resynchronization procedure to align output frame timings of said processed frames according to said output timestamps, said output timing resynchronization procedure being performed after receiving new output timestamps as a result of a powerup initialization event.

* * * * *